United States Patent
Liebig et al.

(10) Patent No.: US 10,253,654 B2
(45) Date of Patent: Apr. 9, 2019

(54) METHOD FOR STARTING A STEAM TURBINE

(71) Applicant: ALSTOM Technology Ltd, Baden (CH)

(72) Inventors: Erhard Liebig, Laufenburg (DE); Jean-Marie Gut, Ebmatingen (CH); Hansjörg Klaiber, Küssaberg (DE); Martin Schoenenberger, Zürich (CH); Goran Hajko, Ozalj (HR)

(73) Assignee: General Electric Technology GmbH, Baden (CH)

( * ) Notice: Subject to any disclaimer, the term of this patent is extended or adjusted under 35 U.S.C. 154(b) by 57 days.

(21) Appl. No.: 14/934,306

(22) Filed: Nov. 6, 2015

(65) Prior Publication Data
US 2016/0160692 A1    Jun. 9, 2016

(30) Foreign Application Priority Data
Dec. 4, 2014    (EP) .................................... 14196216

(51) Int. Cl.
| | |
|---|---|
| *F01K 13/02* | (2006.01) |
| *F01K 23/10* | (2006.01) |
| *F01D 19/02* | (2006.01) |
| *F01D 25/10* | (2006.01) |

(52) U.S. Cl.
CPC .............. *F01K 13/02* (2013.01); *F01D 19/02* (2013.01); *F01D 25/10* (2013.01); *F01K 23/10* (2013.01); *F01K 23/101* (2013.01); *F05D 2220/31* (2013.01); *F05D 2240/24* (2013.01); *F05D 2260/20* (2013.01); *Y02E 20/16* (2013.01)

(58) Field of Classification Search
CPC .......... F01D 19/02; F01D 25/10; F01K 13/02; F01K 23/10; F01K 23/101; F05D 2220/31; F05D 2240/24; F05D 2260/20; Y02E 20/16
See application file for complete search history.

(56) References Cited

U.S. PATENT DOCUMENTS

| | | | | |
|---|---|---|---|---|
| 3,879,616 | A * | 4/1975 | Baker | ..................... F01K 13/02 290/2 |
| 4,329,592 | A * | 5/1982 | Wagner | ................... F01D 19/00 290/40 R |
| 4,353,216 | A | 10/1982 | Dickenson | |
| 5,412,936 | A * | 5/1995 | Lee | ....................... F01K 23/101 60/39.182 |

(Continued)

FOREIGN PATENT DOCUMENTS

| | | |
|---|---|---|
| DE | 10116387 A1 | 10/2002 |
| DE | 10227709 B4 | 7/2011 |

(Continued)

OTHER PUBLICATIONS

S. C. Gulen "Gas Turbine Combined Cycle Fast Start: The Physics Behind the Concept", Power Engineering, p. 1-8, Oct. 31, 2014.

*Primary Examiner* — Jesse Bogue
(74) *Attorney, Agent, or Firm* — Cynthia W. Flanigan; GPO Global Patent Operation

(57) ABSTRACT

The invention relates to a method for starting a steam turbine. The method involves pre-warming the steam turbine with a steam in which 65% of an energy used to pre-warming the steam turbine is derived from a latent heat energy of the steam.

19 Claims, 1 Drawing Sheet

(56) References Cited

U.S. PATENT DOCUMENTS

| | | | |
|---|---|---|---|
| 5,433,079 A * | 7/1995 | Badami | F01D 19/02 60/646 |
| 6,519,927 B2 | 2/2003 | Liebig et al. | |
| 2003/0046939 A1 * | 3/2003 | Hyakutake | F01D 21/12 60/782 |
| 2005/0235649 A1 | 10/2005 | Baer et al. | |
| 2009/0205310 A1 | 8/2009 | Hibshman et al. | |
| 2009/0249788 A1 | 10/2009 | Diesterbeck et al. | |
| 2011/0036066 A1 * | 2/2011 | Zhang | F01D 25/305 60/39.5 |
| 2011/0146278 A1 * | 6/2011 | Deng | F01K 7/223 60/653 |
| 2011/0308251 A1 | 12/2011 | Heue | |
| 2012/0198846 A1 | 8/2012 | Sieben et al. | |
| 2012/0260668 A1 | 10/2012 | Rogers et al. | |
| 2013/0152587 A1 * | 6/2013 | Jordan, Jr. | F02C 7/26 60/645 |
| 2014/0047847 A1 * | 2/2014 | Pasqualon | F01D 19/02 60/778 |
| 2014/0150430 A1 * | 6/2014 | Helbig | F01K 13/02 60/656 |
| 2014/0260254 A1 * | 9/2014 | Yoshida | F01K 13/02 60/664 |
| 2014/0373540 A1 * | 12/2014 | Kim | F01K 13/02 60/646 |
| 2015/0059660 A1 * | 3/2015 | Cocuzza | F01K 9/003 122/406.4 |
| 2015/0267566 A1 * | 9/2015 | Vamvas | F01K 3/186 60/786 |
| 2016/0177822 A1 * | 6/2016 | Howes | F02C 6/16 60/785 |

FOREIGN PATENT DOCUMENTS

| | | |
|---|---|---|
| DE | 102012200769 A1 | 7/2013 |
| EP | 1 736 638 A1 | 12/2006 |
| EP | 1862529 A2 | 12/2007 |
| EP | 2492456 A1 | 8/2012 |
| EP | 2511485 A1 | 10/2012 |
| EP | 2511497 A2 | 10/2012 |
| EP | 2573332 A1 | 3/2013 |
| EP | 2657467 A1 | 10/2013 |
| EP | 2 775 107 A1 | 9/2014 |
| WO | 2013144217 A1 | 10/2013 |

* cited by examiner

METHOD FOR STARTING A STEAM TURBINE

CROSS-REFERENCE TO RELATED APPLICATIONS

This application claims priority to European Patent Application 14196216.7 filed Dec. 4, 2014, the contents of which are hereby incorporated in its entirety.

TECHNICAL FIELD

The present disclosure relates generally to power plants and more specifically to steam turbine warming and pre warming systems for power plants having steam turbines. Such power plants include steam power plants and combined cycle power plants.

BACKGROUND

Shortening start-up times and improving starting reliability while increasing the number of starts is one of many new requirements with respect to plant flexibility that has arisen as a result of the increased use of renewable energy sources such as solar and wind.

A major factor limiting the load output of an existing combined cycle power plant is the allowed pressure and temperature transients of the steam turbine and the heat recovery steam generator as well as the waiting time required to establish warm-up times in the balance of plant and the main piping system. These limitations may also influence the start-up capability of the gas turbine of a combined cycle plant by linking the start-up of the gas turbine with the start-up of the steam turbine.

A method of warming a steam turbine involves using main steam generated from the start-up of a gas turbine or auxiliary steam from other sources generated from within the power plant. This pre-warming is required even for small steam turbines in order to avoid differential temperatures between inner and outer walls of the steam chest, and within the rotor. Unless this is done before the unit is exposed to nominal steam system pressures and temperatures, temperature differentials may create excessive stress in the turbine and/or the turbine steam control valve(s).

Larger steam turbines typically include the step of rolling the turbine during pre-warming. If steam is used to pre-warm the turbine, this introduces further constraints on the pre-warming process by restricting the flow rate of the pre-warming medium. For example, if the turbine is being rolled during the pre-warming process, or if the flow rate of the pre-warming medium is too high through the nominal steam path, the turbine may roll-off the turning gear as it accelerates prematurely. However, if the pre-warming medium flow rate is too low, the heat-up time will be unnecessarily extended.

Modern combine cycle power plants with gas and steam turbines typically require pre-warming of the steam turbine prior to start-up due to the absence of bypass stack between gas turbine and Heat Recovery Steam where typically steam is generated to operate the steam turbine as the absence of such a stack requires parallel starting of the gas turbine and the steam turbine. However, starting the steam turbine requires that the steam temperatures are in accordance with the temperatures of the steam turbine rotors.

With grid specifications requiring high flexibility this necessitates, in particular during the start-up phase, high load gradients of the gas turbine without significant delays are required. This makes a simultaneous parallel start of gas turbine and steam turbine extremely difficult. This means the steam turbine can't be started and remain in steam bypass mode. The result is that the gas turbine, in accordance with the grid operating, must be first operated at relatively high load with the consequence of high gas outlet temperatures. As this result, steam is generated in downstream heat recovery system that has too high a temperature to be used to cold or warm start a steam turbine with excess lifetime loss.

There is therefore an ongoing need for improved pre warming methods to provide fast steam turbine start-up in order to meet flexibility requirements imposed by non-continuous energy sources such as renewable energy and well as improving steam turbine start-up in combined cycle power plants.

SUMMARY

A method for pre-warming a steam turbine is disclosed that can provide reliable and fast start-up of the steam turbine.

One general aspect includes a method for starting a steam turbine comprising the steps of pre-warming the steam turbine using a latent heat energy of a steam wherein at least 65% of an energy used to pre-warm the steam turbine is derived from the latent heat energy of the steam.

Further aspects may include one or more of the following features. The method wherein the step of pre-warming includes filling the steam turbine with the steam. The method wherein filling the steam turbine with the steam involves: a) filling the steam turbine at a first pressure; b) allowing a pressure decay resulting from condensing steam to a second pressure lower than the first pressure; and c) repeating steps a) and b) while stepwise increasing the first pressure and second pressure until a predefined temperature of the steam turbine is achieved.

The method wherein filling the steam turbine with steam involves a) flowing the steam at a first pressure until a steam turbine parameter is reached; and b) repeating step a) with a stepwise increase in the pressure until a predefined temperature of the steam turbine is achieved.

The method wherein filing the steam turbine with the steam involves flowing the steam at a rate such that a steam turbine parameter is not exceed.

The method wherein the steam turbine parameter is at least one of a selection of calculated stress, measured temperature and/or a speed of a rotor of the steam turbine.

The method wherein the stepwise pressure increase corresponds to steam pressures of 4 barg, 10 barg, 16 barg and 22 barg respectively.

The method wherein filling the steam turbine with the steam involves flowing the steam with an increasing pressure gradient through the steam turbine.

The method involving producing an outlet gas from a gas turbine and then generating the steam with the outlet gas which may further involve injecting water into the steam.

The method may also include reducing the temperature of the outlet gas by changing a set point of a gas turbine control system and/or reducing a temperature of the outlet gas by injecting an air into the outlet gas.

One general aspect includes a method for starting a steam turbine in a combined cycle power plant, comprising the steps of operating a gas turbine so as that the gas turbine has a gas turbine exit temperature, generating steam from the gas existing the gas turbine, pre-warming the steam turbine while maintaining the power plant output using the steam such that at least 65% of an energy used to pre-warm the steam turbine is derived from a latent heat energy of the steam, running up the steam turbine to a minimum load, loading the steam turbine to a first steam turbine load while maintaining the first power plant output essentially constant; and increasing the power plant output to a second power plant output greater than the power plant output by loading of either or both the gas turbine and the steam turbine.

The method may also include, prior to pre-warming the steam turbine, changing a set point of a gas turbine control system to reduce a temperature of the gas exiting the gas turbine while maintaining a power plant output essentially constant. As part of the step of generating steam, water may be injected into the steam. The method may further include isolating an exhaust of the steam turbine during pre-warming at the exhaust of the steam turbine by, for example activation of a non-return valve.

Other aspects and advantages of the present disclosure will become apparent from the following description, taken in connection with the accompanying drawings which by way of example illustrate exemplary embodiments of the present invention

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
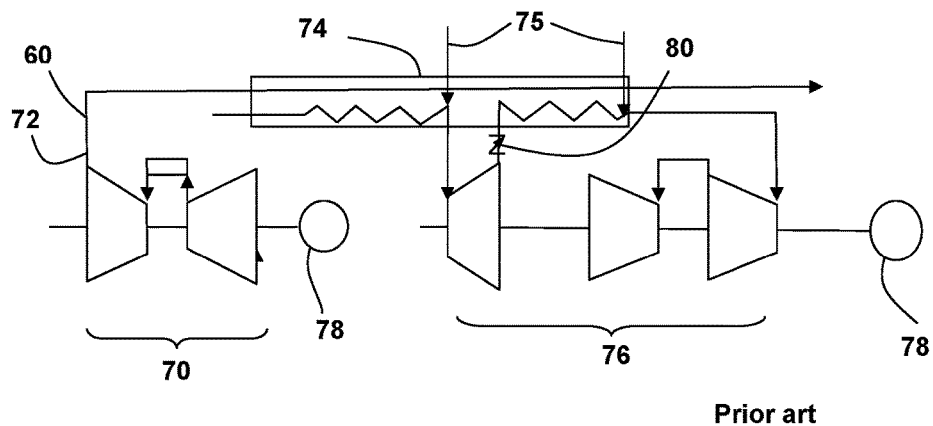
FIG. 1 is a prior art combined cycle power plant to which exemplary embodiments may be applied.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

FIG. 1 shows a power plant to which exemplary embodiments may be applied. The power plant includes a gas turbine 70 that generates hot gases which exits the gas turbine 70 at a gas turbine outlet 72 and are used in a steam generator 74 to generate steam. When the exemplary embodiment is applied to a combined cycle power plant shown in FIG. 1 the steam generator 74 is a Heat Recovery Steam Generator. The generated steam is used to drive a steam turbine 76. Both the steam turbine 76 and the gas turbine 70 drive a generator 78 to generate power.

Exemplary embodiments can be applied to steam power plants without a gas turbine 70 and so are not limited to the combined cycle power plant shown in FIG. 1.

The steam turbines 76 to which exemplary embodiments can be applied include, condensing turbines, backpressure turbines, extraction-condensing turbines and extraction-backpressure turbines. There turbines may have any number of known steam turbine casings and have any known direction of internal steam flow. They further may include steam turbines 76 without reheat in which there are no non-return control means after the first casing or else steam turbines 76 with reheat process that have non-return control means after the first casing that enable filling of the first casing of the steam turbine 76 up to the pressure at which the non-return control means opens.

An exemplary method involves starting a steam turbine 76 by pre-warming the steam turbine 76 using latent heat of steam wherein at least 65% of the pre-warming energy used to pre-warm the steam turbine 76 is derived from the latent heat of steam. The percentage energy used is calculated by dividing sensible heat of a superheated portion of the steam by latent heat at a given steam pressure, which may, during the pre-warming, be constant or else vary.

The exemplary method may be applied to any type of power plant that uses a steam turbine 76 including conventional power plants fuelled by fossil fuel and/or renewable energy, including geothermal or solar, nuclear power plants and plants that use gas turbines 70.

The sourced steam for the pre-warming may be from any source including a boiler or heat recovery steam generator of the same unit as the steam turbine 76, a boiler of another unit or plant of the steam turbine 76, an external heat source or generated from a heat storage device.

An exemplary method involves filling the steam turbine 76 with steam. This may be done in several different ways. In an exemplary embodiment, this is done by filling the steam turbine 76 with a first steam pressure and allowing a pressure decay resulting from the condensation of steam to a second pressure lower than the first pressure, then refilling the steam with a steam at a higher pressure than the first steam and repeating the decay step. With subsequent increases in steam pressure the steam turbine 76 is heated in a controlled manner until the required starting temperature is achieved.

In another exemplary embodiment the steam turbine 76 is filled by flowing a steam at a first steam pressure until a steam turbine 76 parameter is reached and then repeating the process with stepwise increases in steam pressure until a predefined temperature of the steam turbine 76 is achieved. The parameter may be one of a selection of calculated stress, temperature measurement, rotor temperature measurement or rotor speed.

In another exemplary embodiment the steam turbine 76 is filling by flowing a steam with an increasing pressure gradient through the steam turbine 76.

The control of the flowing of steam in these exemplary embodiments may be done by controlling the rotor speed or speed gradient, the turbine load or load gradient or the stroking of a steam control valve.

The actual end conditions that need to be achieved at the conclusion of the pre-warming are dependent in part on the configuration of the steam turbine 76 and in part on the operating steam temperature. As a typically example that may be applicable to some industrial steam turbines 76 configured for power generation, for steam temperatures less than or equal to 400° C., the average rotor starting temperature can be as low as 20° C. to 170° C. in order to avoid either damaging the steam turbine 76 on start-up or else avoiding excessive use of turbine life. In another example when steam temperature is between 400° C. and 484° C., the minimum rotor starting temperature is typically between 170° C. and 310° C. In another example when steam temperature is between 484° C. and 546° C., the minimum rotor starting temperature is typically between 310° C. and 465° C. In another example, when steam temperatures is greater than 546° C. the minimum rotor starting temperature is typically greater than 465° C.

In a typical high performance industrial steam turbine 76 power plant, steam temperature is are typically in the range of 540° C. and 620° C. In an exemplary embodiment steam pressures are stepped to approximately 4 barg, 10 barg, 16 barg and 22 barg.

Figure 2:
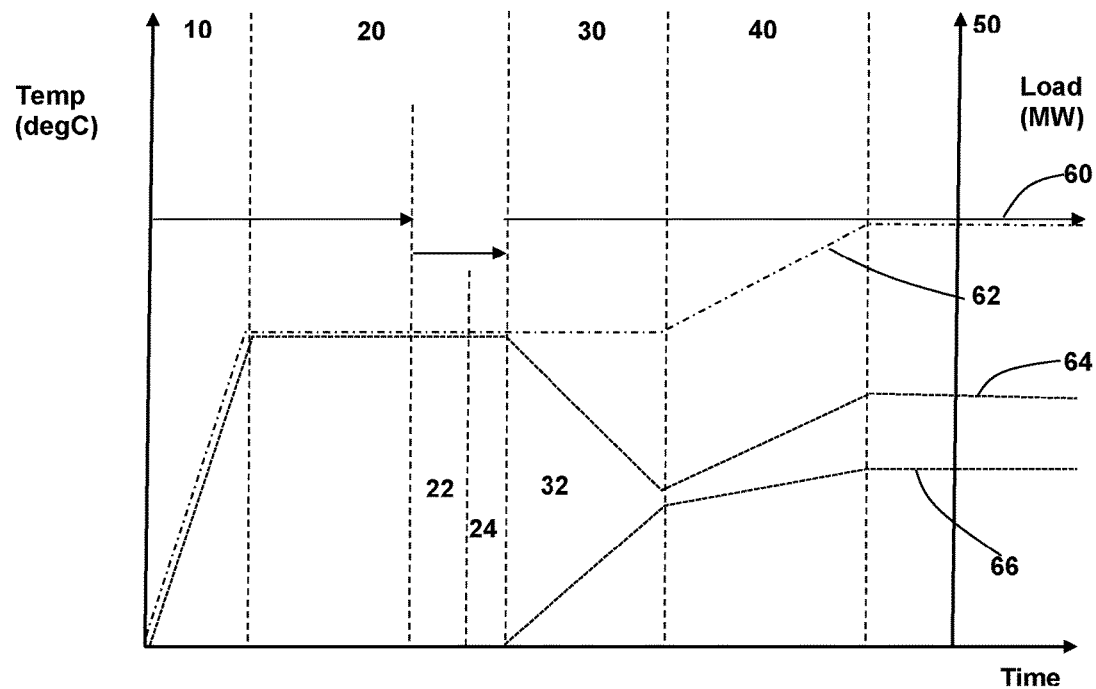
FIG. 2 is a graph of a combined cycle operation utilising an exemplary embodiment.

In another application of the invention an exemplary method involves starting a steam turbine 76 in a combined cycle power plant, an example of which is shown in FIG. 2. The method involves, operating a gas turbine 70 so that gas exiting the gas turbine 70 from a gas turbine outlet 72 has a first temperature at a first power plant power output, reducing the temperature of the gas exiting the gas turbine 70 to a second temperature while maintaining the power plant output essentially constant, generating steam using the gas at the second temperature, pre-warming the steam turbine 76 using the generated steam such that at least 65% of the energy used to pre-warm the steam turbine 76 is latent heat of the steam while maintaining the power plant output constant, starting the steam turbine 76 to a steam turbine load 66 while maintaining the first power plant output essential constant, and finally increasing the power plant output to a second power plant output greater than the first by increasing the load of either or both the gas turbine 70 and the steam turbine 76.

FIG. 2 shows a typical start-up curve for a combined cycle plant using this exemplary embodiment. In the first phase 10 the gas turbine 70 is started up and then, in a second phase 20 operated at steady state operation conditions in which typically the gas turbine outlet/exhaust temperature 60 is such that emissions are minimised. In this second phase 20 the gas turbine 70 is operated in open cycle mode.

The change from operating in open cycle to operating in combined cycle starts during the second phase 20. As high gas turbine 70 outlet/exhaust temperature 60 during open cycle operation would generate high steam temperatures that would not be suitable for pre-warming a steam turbine 76 when in a cold or warm state, the gas turbine outlet/exhaust temperature 60 is lowered, firstly by set-point control of the gas turbine 70 and secondly by water injection 75 into steam generated by gas turbine exit gas by means of an attemperator. Although lowering the gas turbine outlet/exhaust temperature 60 by set-point control may result in increased emissions it has the advantage of requiring no hardware and therefore can simply and easily achieve the desired result.

The lowered gas turbine outlet/exhaust temperature 60 is then used to generate steam for use to pre-warm 22 and run up the steam turbine to minimum load 24. Once these actions are complete the steam turbine 76 can be started. In a third phase 30 the steam turbine load 66 is increased while the gas turbine load 64 is decreased so as to at least maintain the same overall plant power output 62 the same during the gas turbine 70 open cycle operation phase.

In a fourth phase 40, both the gas turbine 70 and steam turbine 76 are loaded in a loading combined cycle phase. During this fourth phase 40 the total power output of the power plant 62 is increased.

In a fifth phase 50 that follows the fourth phase 40 the loadings of the gas turbine 70 and steam turbine 76 are stabilised and the plant operated once more operated under low emission conditions.

In an exemplary embodiment, during pre-warming 22, the steam turbine 76 is isolated at the exhaust of the steam turbine 76 wherein the exhaust is defined as at a point that is upstream of any offtakes, branches or the like and prior to any operation, such as heating or cooling, that may change at condition of the steam exhausted from the steam turbine 76. This enables the pre-warming 22 of the steam turbine 76 without interference from additional steam sources that made be added used to in upstream or downstream steam turbines 76 or steam generators 74.

In a further exemplary embodiment, isolating is achieved by activation of a non-return valve 80. As a non-return valve works on the principle of pressure difference between the inlet and the outlet of the non-return valve 80, activation of a non-return valve 80 means maintaining a pressure at a downstream side of the non-return valve 80 that is higher than a pressure at an upstream side of the non-return valve 80 thereby activating a mechanism within the non-return valve 80 that prevents flow through the non-return valve 80.

Although the disclosure has been herein shown and described in what is conceived to be the most practical exemplary embodiments, the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A method for starting a steam turbine, the method comprising:
   pre-warming and filling the steam turbine with a steam;
   increasing the pressure of the steam by warming the steam in a controlled manner until a required starting temperature for the steam turbine is achieved; and
   wherein at least 65% of energy used to pre-warm the steam turbine is derived from a latent heat energy of the steam.

2. The method of claim 1, wherein filing the steam turbine with the steam comprises flowing the steam at a rate such that a steam turbine parameter is not exceeded, wherein the steam turbine parameter is at least one of a selection of calculated stress, measured temperature, and/or a speed of a rotor of the steam turbine.

3. The method of claim 1, wherein filling the steam turbine with the steam comprises flowing the steam with an increasing pressure gradient through the steam turbine.

4. The method of claim 1, wherein filling the steam turbine with the steam comprises steps of:
   a) filling the steam turbine at a first pressure;
   b) allowing a pressure decay resulting from condensing the steam to a second pressure, wherein the second pressure is lower than the first pressure; and
   c) repeating steps a) and b) with a stepwise increase in the first pressure and the second pressure until a predefined temperature of the steam turbine is achieved.

5. The method of claim 3, wherein the steam pressure increase corresponds to steam pressures of 4 barg, 10 barg, 16 barg, and 22 barg respectively.

6. The method of claim 1, wherein filling the steam turbine with the steam comprises steps of:
   a) flowing the steam at a first pressure until a steam turbine parameter is reached; and
   b) repeating step a) with a stepwise increase in the pressure until a predefined temperature of the steam turbine is achieved.

7. The method of claim 6, wherein the stepwise first pressure increase corresponds to steam pressures of 4 barg, 10 barg, 16 barg, and 22 barg respectively.

8. The method of claim 1, further comprising:
   exhausting an outlet gas, through a gas turbine outlet, from a gas turbine; and
   generating the steam with the outlet gas.

9. The method of claim 8, further comprising reducing temperature of the gas turbine outlet by changing a set point of a gas turbine control system.

10. The method of claim 8, further comprising reducing the temperature of the outlet gas by injecting air into the outlet gas.

11. The method of claim 8, further comprising reducing the temperature of the gas turbine outlet by injecting water into the steam.

12. A method for starting a steam turbine in a combined cycle power plant, comprising:
   generating an outlet gas, through a gas turbine outlet, from a gas turbine;
   generating a steam from the outlet gas exiting the gas turbine;
   pre-warming the steam turbine, while using the generated steam such that at least 65% of energy used to pre-warm the steam turbine is derived from a latent heat energy of the combined cycle power, wherein pressure of the generated steam is increased to warm the steam turbine in a controlled manner until a required starting temperature is achieved;
   running-up the steam turbine to a minimum load;
   loading the steam turbine to a first steam turbine load while maintaining a power plant output essential constant; and
   loading the power plant output to increase the power plant output by loading of either or both the gas turbine and the steam turbine.

13. The method of claim 12, further comprising, prior to pre-warming the steam turbine, changing a set point of a gas turbine control system to reduce the temperature of the gas turbine outlet while maintaining the power plant output essentially constant.

14. The method of claim 12, wherein the temperature of the gas turbine outlet is lowered by injection of water into the generated steam.

15. The method of claim 12, further comprising isolating the steam turbine, during pre-warming, at an exhaust of the steam turbine, wherein the exhaust is at a point that is upstream of any offtakes or branches prior to any heating operation that may change a condition of the steam exhausted from the steam turbine.

16. The method of claim 13, wherein the temperature of the gas turbine outlet is lowered by injection of water into the generated steam.

17. The method of claim 14, further comprising isolating the steam turbine, during pre-warming, at the exhaust of the steam turbine, wherein the exhaust is at a point that is upstream of any offtakes or branches prior to any heating operation that may change a condition of the steam exhausted from the steam turbine.

18. The method of claim 15, wherein the temperature of the gas turbine outlet is lowered by injection of water into the generated steam.

19. The method of claim 16, further comprising isolating the steam turbine, during pre-warming, at the exhaust of the steam turbine, wherein the exhaust is at a point that is upstream of any offtakes or branches prior to any heating operation that may change a condition of the steam exhausted from the steam turbine.

* * * * *